US008892661B2

(12) United States Patent
Ramarao et al.

(10) Patent No.: US 8,892,661 B2
(45) Date of Patent: *Nov. 18, 2014

(54) DETECTING SPAM FROM A BULK REGISTERED E-MAIL ACCOUNT

(75) Inventors: Vishwanath Tumkur Ramarao, Sunnyvale, CA (US); Mark E. Risher, San Francisco, CA (US); Xiaopeng Xi, Sunnyvale, CA (US)

(73) Assignee: Yahoo! Inc., Sunnyvale, CA (US)

( * ) Notice: Subject to any disclaimer, the term of this patent is extended or adjusted under 35 U.S.C. 154(b) by 831 days.

This patent is subject to a terminal disclaimer.

(21) Appl. No.: 12/562,792

(22) Filed: Sep. 18, 2009

(65) Prior Publication Data
US 2010/0077043 A1 Mar. 25, 2010

Related U.S. Application Data

(60) Provisional application No. 61/098,741, filed on Sep. 19, 2008.

(51) Int. Cl.
| G06F 15/16 | (2006.01) |
| G06F 11/00 | (2006.01) |
| G06F 12/14 | (2006.01) |
| G06F 12/16 | (2006.01) |
| G08B 23/00 | (2006.01) |
| G06F 7/04 | (2006.01) |
| G06F 17/30 | (2006.01) |
| H04N 7/16 | (2011.01) |
| H04L 12/58 | (2006.01) |
| H04L 29/06 | (2006.01) |

(52) U.S. Cl.
CPC ............. H04L 12/585 (2013.01); H04L 51/12 (2013.01); H04L 63/1425 (2013.01)
USPC .................. 709/206; 726/22; 726/26; 726/27

(58) Field of Classification Search
USPC .................................. 709/206; 726/22, 26, 27
See application file for complete search history.

(56) References Cited

U.S. PATENT DOCUMENTS 5,930,479 A 7/1999 Hall
6,052,709 A 4/2000 Paul
(Continued)

OTHER PUBLICATIONS

Spamgourmet—Frequently Asked Questions, http://web.archive.org/web/20030829060941/spamgourmet.com/disposableemail.pl?printpage=faq.htm, Archive date: Aug. 29, 2003, 3 pgs.
(Continued)

Primary Examiner — Rupal Dharia
Assistant Examiner — Robert B McAdams
(74) Attorney, Agent, or Firm — James J. DeCarlo; Greenberg Traurig, LLP

(57) ABSTRACT

The invention provides for at least three processes for detecting the probability of abusive use of a message account for sending large amounts of unsolicited messages, such as spam, to other message accounts. For example, information provided at registration for a new message account can be processed to determine the likelihood of abusive use of that message account. Also, inbound messages can be processed to determine if the message account that sent the inbound message is abusing the use of that message account. Additionally, outbound messages can be processed to determine if the message account that is attempting to send an outbound message is abusing the use of that message account. Each of these three processes can operate separately or in any combination with each other to further improve the probability that abusive use of a message account will be detected promptly and accurately.

20 Claims, 8 Drawing Sheets

(56) References Cited

U.S. PATENT DOCUMENTS

| | | | |
|---|---|---|---|
| 6,161,129 A | 12/2000 | Rochkind | |
| 6,266,692 B1 | 7/2001 | Greenstein | |
| 6,389,028 B1 | 5/2002 | Bondarenko et al. | |
| 6,393,465 B2 | 5/2002 | Leeds | |
| 6,415,318 B1 | 7/2002 | Aggarwal et al. | |
| 6,421,709 B1 | 7/2002 | McCormick et al. | |
| 6,453,327 B1 | 9/2002 | Nielsen | |
| 6,591,291 B1 | 7/2003 | Gabber et al. | |
| 6,643,686 B1 | 11/2003 | Hall | |
| 6,650,890 B1 | 11/2003 | Irlam et al. | |
| 6,708,205 B2 | 3/2004 | Sheldon et al. | |
| 6,772,196 B1 | 8/2004 | Kirsch et al. | |
| 6,892,189 B2 | 5/2005 | Quass et al. | |
| 6,957,259 B1 | 10/2005 | Malik | |
| 7,054,906 B2 | 5/2006 | Levosky | |
| 7,120,455 B1 | 10/2006 | Chen et al. | |
| 7,257,842 B2 | 8/2007 | Barton et al. | |
| 7,272,853 B2 | 9/2007 | Goodman et al. | |
| 7,373,385 B2 | 5/2008 | Prakash | |
| 7,475,118 B2 | 1/2009 | Leiba et al. | |
| 7,487,217 B2* | 2/2009 | Buckingham et al. | 709/206 |
| 7,523,168 B2* | 4/2009 | Chadwick et al. | 709/206 |
| 7,577,709 B1 | 8/2009 | Kolcz | |
| 7,647,381 B2 | 1/2010 | Logue et al. | |
| 7,693,945 B1* | 4/2010 | Dulitz et al. | 709/206 |
| 7,711,779 B2 | 5/2010 | Goodman et al. | |
| 7,849,146 B2 | 12/2010 | Choi et al. | |
| 7,873,996 B1 | 1/2011 | Emigh et al. | |
| 8,023,927 B1* | 9/2011 | Coleman et al. | 455/410 |
| 8,069,128 B2 | 11/2011 | Pujara | |
| 8,108,323 B2 | 1/2012 | Weinberger et al. | |
| 2003/0140103 A1 | 7/2003 | Szeto et al. | |
| 2004/0064515 A1 | 4/2004 | Hockey | |
| 2004/0177110 A1 | 9/2004 | Rounthwaite et al. | |
| 2004/0255122 A1 | 12/2004 | Ingerman et al. | |
| 2004/0260776 A1* | 12/2004 | Starbuck et al. | 709/206 |
| 2005/0075921 A1 | 4/2005 | Hayes-Roth | |
| 2005/0210107 A1 | 9/2005 | Mora | |
| 2006/0010215 A1* | 1/2006 | Clegg et al. | 709/206 |
| 2006/0015942 A1* | 1/2006 | Judge et al. | 726/24 |
| 2006/0031328 A1* | 2/2006 | Malik | 709/206 |
| 2006/0036695 A1 | 2/2006 | Rolnik | |
| 2007/0112954 A1 | 5/2007 | Ramani et al. | |
| 2007/0192863 A1 | 8/2007 | Kapoor et al. | |
| 2007/0239639 A1 | 10/2007 | Loughmiller et al. | |
| 2008/0114843 A1 | 5/2008 | Shinde et al. | |
| 2008/0320119 A1 | 12/2008 | Achan et al. | |
| 2009/0019158 A1 | 1/2009 | Langen et al. | |
| 2009/0037546 A1 | 2/2009 | Kirsch | |
| 2009/0210500 A1* | 8/2009 | Brillhart et al. | 709/206 |
| 2009/0216841 A1 | 8/2009 | Choi et al. | |
| 2009/0249481 A1 | 10/2009 | Long et al. | |
| 2010/0076922 A1 | 3/2010 | Hariharan et al. | |
| 2010/0077040 A1 | 3/2010 | Hariharan et al. | |
| 2010/0145900 A1 | 6/2010 | Zheng et al. | |
| 2010/0161734 A1 | 6/2010 | Wang | |

OTHER PUBLICATIONS

Wikipedia, Spamgourmet, Jul. 2007, http://en.wikipedia.org/wiki/spamgourmet, 2 pgs.

"Bloom Filter," Wikipedia, the free encyclopedia, 7 pgs., http://en.wikipedia.org/wiki/Bloom_filter (accessed May 22, 2007).

Dhamija, Rachna, "Security Skins: Embedded, Unspoofable Security Indicators," Jun. 19, 2006, 57 pgs., Harvard University.

Dhamija, Rachna et al., "Why Phishing Works," Apr. 2006, 10 pgs.

Dhamija, Rachna et al., "The Battle Against Phishing: Dynamic Security Skins," Jul. 2005, 12 pgs.

Registration Demonstration; Sign-in From New Device; Sign-in Demonstration, 20 pgs., http://passmarksecurity.breezecentral.com/p70238971 (accessed Jun. 13, 2006).

Kristol, D. et al., "HTTP State Management Mechanism," Feb. 1997, 21 pgs., Network Working Group.

Taylor, Bradley, "Sender Reputation in a Large Webmail Service," Jul. 27, 2006, 6 pgs., Google Inc.

Taylor, Bradley, "Sender Reputation in a Large Webmail Service CEAS 2006," Jul. 27, 2006, 19 pgs., Google Inc.

"Antivirus software," Wikipedia, the free encyclopedia, 4 pages, http://en.wikipedia.org/wiki/Virus_scanner, (accessed Nov. 27, 2007).

Iwanchuk, Russ, FindArticles—"IM Anti-Virus and IM Message Inspector," http://findarticles.com/p/articles/mi_zdpcm/is_200106/ai_ziff2220/print, p. 1 of 1, Oct. 29, 2007.

"Malware," Wikipedia, the free encyclopedia, 8 pages, http://en.wikipedia.org/wiki/Malware, (accessed Nov. 27, 2007).

"Instant messaging," Wikipedia, the free encyclopedia, 7 pages, http://en.wikipedia.org/wiki/Instant_messaging, (accessed Nov. 27, 2007).

International Search Report and Written Opinion, mailed Jan. 31, 2006 for Patent Application PCT/US04/35402 filed on Oct. 26, 2004.

Slashdot, FAQ—Comments and Moderation#cm600, http://slashdot.org/fq.com-mod.shtml, pp. 1-18, Nov. 15, 2007.

Flickr Community Guidelines, http://flickr.com/guidelines.gne, pp. 1-3, Nov. 15, 2007.

Craigslist online community, craigslist help > flags and community moderation, http://www.craigslist.org/about/help/flags_and_community_moderation, updated Nov. 7, 2007.

U.S. Appl. No. 12/341,323, filed Dec. 22, 2008.
U.S. Appl. No. 12/188,612, filed Aug. 8, 2008.
U.S. Appl. No. 12/123,270, filed May 19, 2008.
U.S. Appl. No. 12/561,940, filed Sep. 17, 2009.
U.S. Appl. No. 12/561,875, filed Sep. 17, 2009.

Segal, R. "Combining global and personal anti-spam filtering," Proc. of the 4th Conference on Email and Anti-Spam (CEAS), 2007, pp. 1-8.

Official Communication for U.S. Appl. No. 12/561,875 mailed Apr. 2, 2012.
Official Communication for U.S. Appl. No. 12/561,940 mailed Mar. 12, 2012.
Official Communication for U.S. Appl. No. 12/341,323 mailed Dec. 27, 2010.
Official Communication for U.S. Appl. No. 12/341,323 mailed Jul. 8, 2011.
Official Communication for U.S. Appl. No. 12/188,612 mailed Mar. 29, 2011.
Official Communication for U.S. Appl. No. 12/188,612 mailed Aug. 10, 2011.
Official Communication for U.S. Appl. No. 12/123,270 mailed May 10, 2011.
Official Communication for U.S. Appl. No. 12/123,270 mailed Oct. 27, 2011.
Official Communication for U.S. Appl. No. 12/035,371 mailed Mar. 30, 2010.
Official Communication for U.S. Appl. No. 12/035,371 mailed Aug. 19, 2010.
Official Communication for U.S. Appl. No. 12/561,940 mailed Jun. 20, 2012.

* cited by examiner

*Inbound*

US 8,892,661 B2

DETECTING SPAM FROM A BULK REGISTERED E-MAIL ACCOUNT

CROSS-REFERENCE TO RELATED APPLICATIONS

This Utility patent application claims the benefit of U.S. Provisional Application No. 61/098,741, filed Sep. 19, 2008 the benefit of the earlier filing date of which is hereby claimed under 35 U.S.C. 119(e) and further incorporated by reference in its entirety.

TECHNICAL FIELD

The present invention relates generally to detecting the abusive use of a message account. More particularly, the invention enables detection at the time of registration for a message account and afterwards of the probability that the message account is likely to be used for the abusive purpose of sending a significantly large number of unsolicited messages to other message accounts.

BACKGROUND

The use of e-mail, instant messaging and other methods of sending electronic messages over the Internet is very popular due to the ease, availability and speed of communication. Electronic forms of communication have become integral in both business and personal settings. Text messages and other content can be created and sent with tremendous ease, with very little cost other than the cost of a networked computer. Once Internet access is obtained, a user has the ability to open multiple electronic accounts for sending and receiving messages. Most of these accounts can be opened without payment, that is, are free of charge. The ease and low cost of access to electronic accounts has given rise to abusive use in the form of spamming.

Spamming is the abuse of electronic messaging systems to indiscriminately send unsolicited bulk messages or fraudulent messages. The most widely recognized form of spam is e-mail spam. However, the term may applied to similar abuses in other media: instant messaging spam, usenet newsgroup spam, web search engine spam, spam in blogs, wiki spam, mobile phone messaging spam, Internet forum spam and junk fax transmissions.

Spam in e-mail started to become a problem when the Internet was opened up to the general public in the mid-1990s. It grew exponentially over the following years, and is estimated today to comprise some 80 to 85% of all the e-mail in the world. Instant Messaging spam, sometimes termed spam, makes use of instant messaging systems. Many IM systems offer a user directory, including demographic information that allows an advertiser to gather the information, sign on to the system, and send unsolicited messages. To send instant messages to millions of users requires scriptable software and the recipients' IM usernames. Spammers have similarly targeted Internet Relay Chat channels, using IRC bots that join channels and bombard them with advertising. Mobile phone spam is directed at the text messaging service of a mobile phone. This can be especially irritating to customers not only for the inconvenience but also because of the fee they may be charged per text message received in some markets. Many online games allow players to contact each other via player-to-player messaging, chat rooms, or public discussion areas. What qualifies as spam varies from game to game, but usually this term applies to all forms of message flooding, violating the terms of service contract for the website.

Spamming is widely reviled, and has been the subject of legislation in many jurisdictions. In addition, many users are bothered by spam because it impinges upon the amount of time they spend reading their e-mail. Many also find the content of spam frequently offensive, in that pornography is one of the most frequently advertised products. Spammers send their spam largely indiscriminately, so pornographic ads may show up in a work place or a family account.

Spamming is economically viable because advertisers that use spam to market products and services have almost no operating costs beyond the management of their mailing lists, and it is difficult to hold senders of spam accountable for their massive message campaigns. Because the world wide barriers to entry are so low to be a spammer, they are numerous, and the volume of unsolicited spam messages has increased every year. The negative costs of spam messages, such as lost productivity by those who view them and fraudulent products and/or services that are sold in this matter, are borne by the public, Internet service providers and/or message account providers. The Internet service and message account providers are forced to pay for extra processing capacity to cope with the large amount of spam messages. There is also reputation damage that may be caused by spammers. For example, spam filters may black-list a particular server if it gets a "bad reputation" for the sending of spam messages. This requires time and effort to resolve, usually by several people. There are the direct costs, as well as the indirect costs borne by the victims—both those related to the spamming itself, and to other crimes that usually accompany it, such as financial theft, identity theft, data and intellectual property theft, virus and other malware infection, fraud, and deceptive marketing.

Because spamming contravenes the vast majority of message account providers' acceptable-use policies, most spammers make a considerable effort to conceal the abusive use of their message accounts for spam messaging. For example, spam messages are often forwarded through insecure proxy servers belonging to unwitting third parties. Also, spammers frequently use false names, addresses, phone numbers, and other contact information to set up "disposable" message accounts at various providers. Additionally spammers often generate different usernames for each account. In many instances the creation of such accounts is automated to some extent so that large numbers of accounts can be created. In some cases, spammers have used falsified or stolen credit card numbers to pay for these accounts. Typically, spammers quickly move from one message account to the next as each abusive use of a message account is discovered.

Therefore, it is with respect to these considerations and others that the present invention has been made.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description, which is to be read in association with the accompanying drawings, wherein.

DETAILED DESCRIPTION

Figure 1:
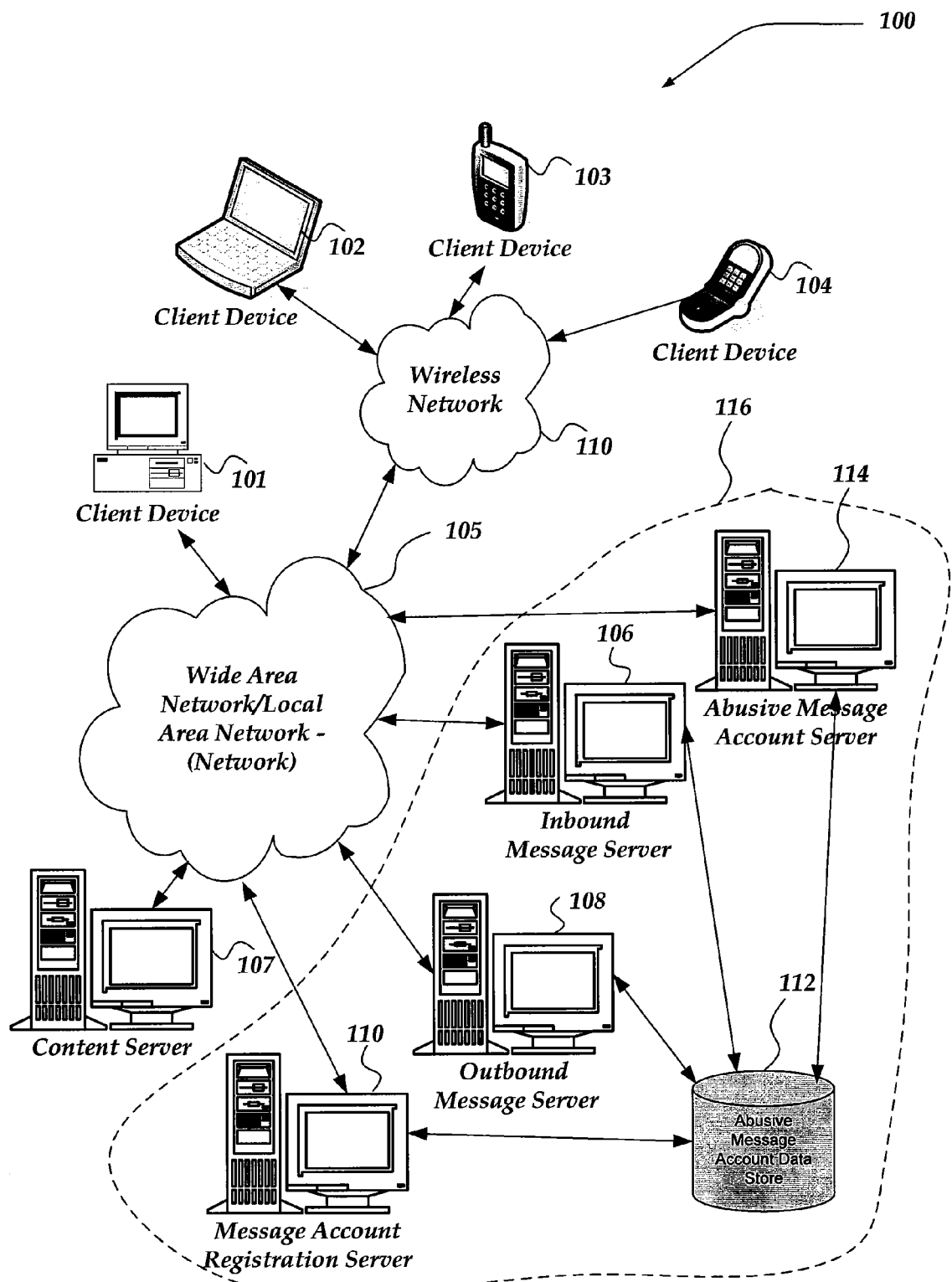
FIG. 1 illustrates a system diagram of one embodiment of an environment in which the invention may be practiced.

The present invention now will be described more fully hereinafter with reference to the accompanying drawings, which form a part hereof, and which show, by way of illustration, specific embodiments of the invention. However, this invention may be embodied in many different forms and should not be construed as limited to the embodiments set forth herein. Rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. Therefore, the following detailed description is not to be taken in a limiting sense.

Throughout the specification and claims, the following terms take the meanings explicitly associated herein, unless the context clearly dictates otherwise. The phrase "in one embodiment" does not necessarily refer to the same embodiment, although it may. Furthermore, the phrase "in another embodiment" does not necessarily refer to a different embodiment, although it may. Thus, as described below, various embodiments of the invention may be readily combined without departing from the scope or spirit of the invention.

An "abusive message" is any message, including but not limited to e-mail, instant messages, text messages, and the like, that is sent unsolicited to a large number of other message accounts in nearly identical form. Spam (E-mail) and Spam (Instant Messaging) are two examples of an abusive messages.

A "username" is an identifier that may be composed of letters, numbers or symbols (collectively defined as alphanumeric characters) that is used to gain access to, and uniquely identify, a message account and/or a network. Generally, but not always, a unique username will be selected by the user that initially registers for use of a message account. Typically, a domain name identifies the provider of the message account for the user, and which is appended to the username and separated by the "@" symbol.

The following briefly describes the embodiments of the invention to provide a basic understanding of some aspects of the invention. This brief description is not intended as an extensive overview. It is not intended to identify key or critical elements, or to delineate or otherwise narrow the scope. Its purpose is merely to present some concepts in a simplified form as a prelude to the more detailed description that is presented later.

The invention provides for at least three processes for detecting the probability of abusive use of a message account for sending large amounts of unsolicited messages to other message accounts. For example, information provided at registration for a new message account can be processed to determine the likelihood of abusive use of that message account. Also, inbound messages can be processed to determine if the message account that sent the inbound message is abusing the use of that message account. Additionally, outbound messages can be processed to determine if the message account that is attempting to send an outbound message is abusing the use of that message account. Each of these three processes can operate separately or in any combination with each other to further improve the probability that abusive use of a message account will be detected promptly and accurately.

In regard to the registration process for a new message account, factors are analyzed to determine a probability score that a message account will be subsequently abusively used to send large numbers of unsolicited messages to other message accounts. The factors that are analyzed can include, but are not limited to: the user's contact information, characteristics of the chosen username, features of browser used for registration, similarity of contact information to other contact information for other new registrations within a time period, previous abusive message account use by the user or another user with somewhat the same contact information, network IP address of the user's request for the message account, and the like. The contact information typically includes personal information about the user, such as their given name, gender, birthday, country of residence, address, affiliations, referral, and the like. The user is also given the opportunity to choose/provide a unique username and password for the new message account.

In at least one or more embodiments of the registration process, heuristics, statistics, clustering of information, logical decision trees, artificial intelligence, machine learning, and the like, are employed either singly, or in any combination, to determine the probability score for subsequent abusive use by the registered message account. If at time of registration the probability score is determined for the message account to be greater than or equal to a threshold value, the process may deactivate, deny, require more information and/or analysis, or suspend the message account.

Abusive message accounts are likely to have usernames that have particular known combinations of characteristics, such as overall length, amount of letters, amount of numbers, amount of symbols, and the amount of transitions between these letters, numbers, and symbols. Since automated processes are often employed to generate registrations for message accounts intended for abusive use, these automated process tend to create certain patterns in the usernames that they generate. For example, a high probability of a selected username being automatically generated exists if the length of the username is greater than eighteen and the amount of symbols in the user name is greater than or equal to one.

In regard to the inbound message process, several factors either singly or in any combination are considered in the determination of the probability score for current abusive use of the message account, including, but not limited to: the overall length of the username, the amount of transitions in the username, the amount of numbers in the username, the amount of letters in the username, the amount of symbols in the username, amount of previous inbound messages from that message account within a time period, amount of previous inbound messages with similar content from other message accounts, amount of recipients of inbound messages sent by the message account, and the like. Also, the particular domain of origination associated with the message account may be more probable to be associated with an abusive message account than other domains. Further, heuristical values, statistical values, and the like, are also considered in the determination of the probability score for the abusive use of the message account.

Additionally, in at least one or more embodiments of the processing of the inbound messages, heuristics, statistics, clustering of similar inbound messages, logical decision trees, artificial intelligence, machine learning, and the like, can be employed either singly, or in any combination, to determine the probability score for abusive use by the message account associated with the inbound message. Some of the contributing factors that may be considered in the determination of the probability score may include, but aren't limited to: choice of username, features of application such as a browser used for registration, similarity of contact information to other contact information provided for the registration of other message accounts within a time period, previous abusive message account use by the user or another user with somewhat the same contact information, network IP address of the user's request for a message account, and the like. And if the probability score is determined for the message account to be greater than or equal to a threshold value, the process may not deliver the inbound message, and the like. Also, in this case, if the message account's domain is also accessible to the inbound message process, the message account may be deactivated or suspended.

In regard to the outbound message process, several factors either singly or in any combination are considered in the determination of the probability score for current abusive use of the message account, including, but not limited to: the overall length of the username, the amount of transitions in the username, the amount of numbers in the username, the amount of letters in the username, the amount of symbols in the username, amount of previous outbound messages from that message account within a time period, amount of previous inbound messages with similar content from other message accounts, amount of recipients of inbound messages sent by the message account, network IP address of the user's request for the message account, and the like. Also, the particular domain of origination associated with the message account may be more probable to be associated with an abusive message account than other domains. Further, heuristic values, statistical values, and the like, are also considered in the determination of the probability score for the abusive use of the message account registration.

Additionally, in at least one embodiment of the processing of outbound messages, heuristic values, statistics, clustering of similar inbound messages, logical decision trees, artificial intelligence, machine learning, and the like, can be employed either singly, or in any combination, to determine the probability score for abusive use by the message account associated with the outbound message. Some of the contributing factors that may be considered in the determination of the probability score may include, but aren't limited to: choice of username, features of application such as a browser used for registration, similarity of contact information for the message account to other contact information for other registrations of other message accounts provided within a time period, previous abusive message account use by the user, and the like. And if the probability score is determined for the message account to be greater than or equal to a threshold value, the process may not deliver the inbound message. Also, in this case, if the message account's domain is controlled by the process, the message account may be deactivated or suspended.

Generally, heuristic values, statistical values, and determined data may be combined with other factors and values, changed, and/or updated over time to determine the probability score for abusive use of a message account. For example, heuristic and/or statistical values associated with an inbound message may be changed by Artificial Intelligence and/or Machine Learning processes if certain characteristics of a registration for the username's message account becomes similar to the characteristics of other registrations for known abusive message accounts. The probability score is continuously updated over time based on changes that occur in the various factors considered for the probability score determination.

Also, the heuristic values, statistical values, and determined data are updated regularly as new data and information is collected for detecting message abuse. Also, feedback regarding abusive use of a message account may come from a third party, such as a notice from a message account provider that a particular message account is a source of abusive messages. As another example, the feedback may come from complaints by other message accounts that have received abusive messages from a particular message account, or the like.

Illustrative Operating Environment

FIG. 1 shows components of one embodiment of an environment in which the invention may be practiced. Not all the components may be required to practice the invention, and variations in the arrangement and type of the components may be made without departing from the spirit or scope of the invention. As shown, system 100 of FIG. 1 includes local area networks ("LANs")/wide area networks ("WANs")—(network) 105, wireless network 110, client devices 101-104, anti-spam server 106, and content server 108.

Generally, client devices 102-104 may include virtually any mobile computing device capable of receiving and sending communications over a network, such as wireless network 110, or the like. Such devices include portable devices such as, cellular telephones, smart phones, pagers, radio frequency (RF) devices, infrared (IR) devices, Personal Digital Assistants (PDAs), handheld computers, laptop computers, wearable computers, tablet computers, integrated devices combining one or more of the preceding devices, or the like. One embodiment of a mobile device usable as one of client devices 102-104 is described in more detail below in conjunction with FIG. 2.

Client device 101 may include virtually any computing device that typically connects using a wired communications medium such as personal computers, multiprocessor systems, microprocessor-based or programmable consumer electronics, network PCs, or the like. In one embodiment, client devices 101-104 may be configured to operate over a wired and/or a wireless network.

Client devices 101-104 typically range widely in terms of capabilities and features. For example, a cell phone may have a numeric keypad and a few lines of monochrome LCD display on which only text may be displayed. In another example, a web-enabled client device may have a touch sensitive screen, a stylus, and several lines of color LCD display in which both text and graphics may be displayed.

A web-enabled client device may include a browser application that is configured to receive and to send web pages, web-based messages, or the like. The browser application may be configured to receive and display graphics, text, multimedia, or the like, employing virtually any web based language, including a wireless application protocol messages (WAP), or the like. In one embodiment, the browser application is enabled to employ Handheld Device Markup Language (HDML), Wireless Markup Language (WML), WMLScript, JavaScript, Standard Generalized Markup Language (SMGL), HyperText Markup Language (HTML), eXtensible Markup Language (XML), or the like, to display and send communications.

Client devices 101-104 also may include at least one other client application that is configured to receive content from another computing device. The client application may include a capability to provide and receive textual content, multimedia information, or the like. The client application may further provide information that identifies itself, including a type, capability, name, or the like. In one embodiment, client devices 101-104 may uniquely identify themselves through any of a variety of mechanisms, including a phone number, Mobile Identification Number (MIN), an electronic serial number (ESN), network address, or other device identifier. The information may also indicate a content format that the client device is enabled to employ. Such information may be provided in a communication, or the like, sent to another computing device.

Client devices 101-104 may also be configured to communicate messages through email, Short Message Service (SMS), Multimedia Message Service (MMS), instant messaging (IM), internet relay chat (IRC), Mardam-Bey's IRC (mIRC), Jabber, or the like, with and between another computing device. However, the present invention is not limited to these communication protocols, and virtually any other communication protocol may be employed. Client devices, such as client device 102, may be configured to implement transmission of voice through the internet or other packet-switched networks through Voice-over-Internet protocol (VoIP).

Client devices 101-104 may further be configured to include a client application that enables the user to log into a message account for a message communication application that may be managed by another computing device, such as message system 116, or the like. Such a message account, for example, may be configured to enable the user to receive emails, send/receive IM messages, SMS messages, access selected web pages, participate in a social networking activity, provide messages that may include links or attachments, or the like. However, managing of message communications may also be performed without having to log into a message account.

Wireless network 110 is configured to couple client devices 102-104 with network 105. Wireless network 110 may include any of a variety of wireless sub-networks that may further overlay stand-alone ad-hoc networks, or the like, to provide an infrastructure-oriented connection for client devices 102-104. Such sub-networks may include mesh networks, Wireless LAN (WLAN) networks, cellular networks, or the like.

Wireless network 110 may further include an autonomous system of terminals, gateways, routers, or the like connected by wireless radio links, or the like. These connectors may be configured to move freely and randomly and organize themselves arbitrarily, such that the topology of wireless network 110 may change rapidly.

Wireless network 110 may further employ a plurality of access technologies including 2nd (2G), 3rd (3G), $4^{th}$ (4G) generation radio access for cellular systems, WLAN, WiMax, Wireless Router (WR) mesh, or the like. Access technologies such as 2G, 3G, 4G, and future access networks may enable wide area coverage for client devices, such as client devices 102-104 with various degrees of mobility. For example, wireless network 110 may enable a radio connection through a radio network access such as Global System for Mobile communication (GSM), Time Division Multiple Access (TDMA), General Packet Radio Services (GPRS), Enhanced Data GSM Environment (EDGE), Wideband Code Division Multiple Access (WCDMA), CDMA2000, Bluetooth, or the like. In essence, wireless network 110 may include virtually any wireless communication mechanism by which information may travel between client devices 102-104 and another computing device, network, or the like.

Network 105 is configured to couple Message Communication system 116 and its components, e.g., Inbound Message Server 106, Outbound Message Server 108, Message Account Registration Server 110, Abusive Message Account Server 114, Abusive Message Account Datastore 112, with other computing devices, including, client device 101, and through wireless network 110 to client devices 102-104. Network 105 is enabled to employ any form of computer readable media for communicating information from one electronic device to another. Also, network 105 can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another. Also, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), Ethernet, wireless links including satellite links, or other communications links known to those skilled in the art. Furthermore, remote computers and other related electronic devices could be remotely connected to either LANs or WANs via a modem and temporary telephone link. In essence, network 105 includes any communication method by which information may be communicated between computing devices.

Additionally, computer readable media for communication typically embodies computer-readable instructions, data structures, program modules, or other data in a modulated data signal such as a carrier wave, data signal, or other transport mechanism and includes any information delivery media. The terms "modulated data signal," and "carrier-wave signal" includes a signal that has one or more of its characteristics set or changed in such a manner as to encode information, instructions, data, or the like, in the signal. By way of example, this communication media includes wired media such as twisted pair, coaxial cable, fiber optics, wave guides, and other wired media and wireless media such as acoustic, RF, infrared, and other wireless media.

One embodiment of Message Communication System 116 is described in more detail below in conjunction with FIG. 3. Briefly, however, system 116 may include one or more computing device capable of connecting to network 105 to enable managing of message communications to and from a user. In one embodiment, system 116 may provide an interface to a user of client devices 101-104 that may be used to post, spread, delete, or otherwise manage distribution of message communications.

Also, Message Communication System 116 is arranged to include Message Account Registration Server 110, which is configured to receive new account registration information from a user, including, but not limited to, a proposed username, contact information, browser application, network IP address, and the like. Abusive Message Account Server 114 performs one or more processes to determine a probability score as to whether the new message account is likely to be used for abusive purposes. And if the probability score is greater than or equal to a threshold, Abusive Message Account Server 114 employs the probability score and the operation of and information collected by Inbound Message Server 106, Outbound Message Server 108, Message Account Registration Server 110, and Abusive Message Account Data store 112 to deny, suspend, or request further information in regard to the registration and/or operation of a message account. Information related to the management, processing, and determining of data for abusive message accounts is stored in the Abusive Message Account Data store 112.

It should be noted that while FIG. 1 illustrates a use of message system 116 to manage communications, the invention is not so limited. For example, as noted above, client devices 101-104 may also be configured with a client application, script, plug-in, widget, applet, or the like, that is configured and arranged to enable the client device to manage communications either to or from a user. Moreover, in another embodiment, various functions performed by message system 116 may be distributed across a plurality of network devices or client devices. Inbound Message Server 106, Outbound Message Server 108, Message Account Registration Server 110, Abusive Message Account Server 114, and Abusive Message Account Data store 112.

Content server 107 includes virtually any network computing device that is configured to provide various resources, including content and/or services over network 105. As such, content server 108 represents one embodiment of a content system. Content server 108 may provide access to any of a variety of content, including, but not limited to messages, such as emails, SMS messages, IM messages; search results; news; articles; websites; hyperlinks; ads; reviews; as well as content that may include audio files, video files, text files, streaming files, graphical files, or the like. Thus, virtually any content may be available through content server 108 for access by client devices 101-104. In one embodiment, content server 108 might be configured and arranged to provide a website for users to post, view, link to, and/or otherwise access, content. Content server 108 might also provide FTP services, APIs, web services, database services, or the like, to enable users to access content. In addition, content server 108 may also provide a messaging service, such as an email server, text messaging server, or the like. However, content server 108 is not limited to these mechanisms, and/or content, and others are envisaged as well.

Content server 107 may include an interface that may request information from a user of client devices 101-104. For example, content server 107 may provide access to an account, which may request user log-in information. Such log-in information may include a user name, password, or other identifier of the user and/or client device used by the user. Moreover, content server 107 may also be configured to manage information for a user, such as an address book, buddy list, or other type of contact list. Such contact lists may be made available to Message system 116, in one or more embodiments.

Devices that may operate as content server 107 include, but are not limited to personal computers, desktop computers, multiprocessor systems, microprocessor-based or programmable consumer electronics, network PCs, servers, network appliances, and the like. Moreover, while Content Server 107, Inbound Message Server 106, Outbound Message Server 108, Message Account Registration Server 110, Abusive Message Account Server 114, and Abusive Message Account Datastore 112 are illustrated as distinct devices, the invention is not so limited. For example, in one embodiment, servers 106, 108, 110, and 114 may be implemented within a single network device or mobile device, or distributed across a plurality of network devices.

Illustrative Client Environment

Figure 2:
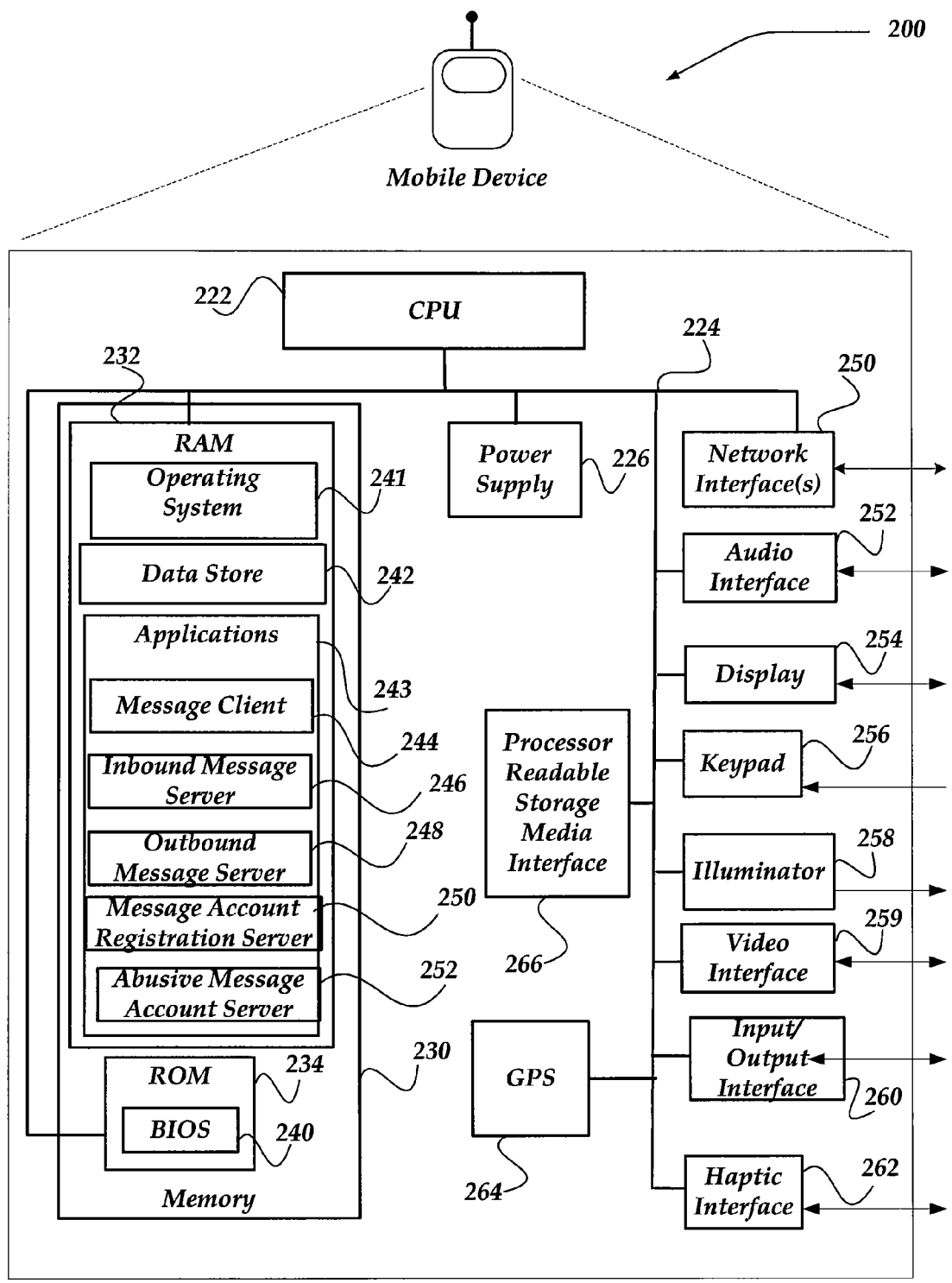
FIG. 2 shows a mobile device that enables operation of one embodiment of the invention.

FIG. 2 shows one embodiment of mobile device 200 that may be included in a system implementing the invention. Mobile device 200 may include many more or less components than those shown in FIG. 2. However, the components shown are sufficient to disclose an illustrative embodiment for practicing the present invention. Mobile device 200 may represent, for example, one of client devices 102-104 of FIG. 1.

As shown in the figure, mobile device 200 includes a processing unit (CPU) 222 in communication with a mass memory 230 via a bus 224. Mobile device 200 also includes a power supply 226, one or more network interfaces 250, an audio interface 252, video interface 259, a display 254, a keypad 256, an illuminator 258, an input/output interface 260, a haptic interface 262, a processor readable storage media interface 266, and an optional global positioning systems (GPS) receiver 264. Power supply 226 provides power to mobile device 200. A rechargeable or non-rechargeable battery may be used to provide power. The power may also be provided by an external power source, such as an AC adapter or a powered docking cradle that supplements and/or recharges a battery.

Mobile device 200 may optionally communicate with a base station (not shown), or directly with another computing device. Network interface 250 includes circuitry for coupling mobile device 200 to one or more networks, and is constructed for use with one or more communication protocols and technologies including, but not limited to, global system for mobile communication (GSM), code division multiple access (CDMA), time division multiple access (TDMA), user datagram protocol (UDP), transmission control protocol/Internet protocol (TCP/IP), SMS, general packet radio service (GPRS), WAP, ultra wide band (UWB), IEEE 802.16 Worldwide Interoperability for Microwave Access (WiMax), SIP/RTP, Bluetooth™, infrared, Wi-Fi, Zigbee, or any of a variety of other wireless communication protocols. Network interface 250 is sometimes known as a transceiver, transceiving device, or network interface card (NIC).

Audio interface 252 is arranged to produce and receive audio signals such as the sound of a human voice. For example, audio interface 252 may be coupled to a speaker and microphone (not shown) to enable telecommunication with others and/or generate an audio acknowledgement for some action. Display 254 may be a liquid crystal display (LCD), gas plasma, light emitting diode (LED), or any other type of display used with a computing device. Display 254 may also include a touch sensitive screen arranged to receive input from an object such as a stylus or a digit from a human hand.

Video interface 259 is arranged to capture video images, such as a still photo, a video segment, an infrared video, or the like. For example, video interface 259 may be coupled to a digital video camera, a web-camera, or the like. Video interface 259 may comprise a lens, an image sensor, and other electronics. Image sensors may include a complementary metal-oxide-semiconductor (CMOS) integrated circuit, charge-coupled device (CCD), or any other integrated circuit for sensing light.

Keypad 256 may comprise any input device arranged to receive input from a user. For example, keypad 256 may include a push button numeric dial, or a keyboard. Keypad 256 may also include command buttons that are associated with selecting and sending images. Illuminator 258 may provide a status indication and/or provide light. Illuminator 258 may remain active for specific periods of time or in response to events. For example, when illuminator 258 is active, it may backlight the buttons on keypad 256 and stay on while the client device is powered. Also, illuminator 258 may backlight these buttons in various patterns when particular actions are performed, such as dialing another client device. Illuminator 258 may also cause light sources positioned within a transparent or translucent case of the client device to illuminate in response to actions.

Mobile device 200 also comprises input/output interface 260 for communicating with external devices, such as a headset, or other input or output devices not shown in FIG. 2. Input/output interface 260 can utilize one or more communication technologies, such as USB, infrared, Bluetooth™, Wi-Fi, Zigbee, or the like. Haptic interface 262 is arranged to provide tactile feedback to a user of the client device. For example, the haptic interface may be employed to vibrate mobile device 200 in a particular way when another user of a computing device is calling.

Additionally, Processor Readable Storage Media Interface 266 is operative to provide access to processor readable information stored on various types of storage media, including but not limited to, floppy disks, optical disks, removable memory cards, removable memory sticks, FLASH memory drives, tape drives, and the like. Processor readable storage media may include volatile, nonvolatile, removable, and non-removable media implemented in any method or technology for storage of information, such as computer readable instructions, data structures, program modules, or other data. Examples of processor readable storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computing device.

GPS transceiver 264 is arranged to determine the physical coordinates of mobile device 200 on the surface of the Earth, which typically outputs a location as latitude and longitude values. GPS transceiver 264 can also employ other geo-positioning mechanisms, including, but not limited to, triangulation, assisted GPS (AGPS), E-OTD, CI, SAI, ETA, BSS or the like, to further determine the physical location of mobile device 200 on the surface of the Earth. It is understood that under different conditions, GPS transceiver 264 can determine a physical location within millimeters for mobile device 200; and in other cases, the determined physical location may be less precise, such as within a meter or significantly greater distances. In one embodiment, however, a client device may through other components, provide other information that may be employed to determine a physical location of the device, including for example, a MAC address, IP address, or the like. This physical location of the device and/or change in physical location of the device may be used as part of the condition-related status of the user or as part of the condition under which communications may be made with the user.

Mass memory 230 includes a RAM 232, a ROM 234, and other storage means. Mass memory 230 illustrates another example of computer readable storage media for storage of information such as computer readable instructions, data structures, program modules, or other data. Mass memory 230 stores a basic input/output system ("BIOS") 240 for controlling low-level operation of mobile device 200. The mass memory also stores an operating system 241 for controlling the operation of mobile device 200. It will be appreciated that this component may include a general purpose operating system such as a version of UNIX, or LINUX™, or a specialized client communication operating system such as Windows Mobile™, the Symbian® operating system, or Apple® Mobile Operating System. The operating system may include, or interface with a Java virtual machine module that enables control of hardware components and/or operating system operations via Java application programs.

Memory 230 further includes one or more data store 242, which can be utilized by mobile device 200 to store, among other things, applications and/or other data. Memory 230 can also be used to store the user's knowledge base. For example, data storage 242 may also be employed to store information that describes various capabilities of mobile device 200. Also, data store 242 may be arranged to store information regarding the abusive use of a message account. The information may then be provided to another device based on any of a variety of events, including being sent as part of a header during a communication, sent upon request, or the like. Moreover, data store 242 may also be employed to store personal information including but not limited to address lists, contact lists, personal preferences, profiles, or the like. At least a portion of the information may also be stored on a disk drive or other processor readable storage medium (not shown) for mobile device 200.

Applications 243 may include message client 244 which, when executed by mobile device 200, transmit, receive, and/or otherwise process messages (e.g., SMS, MMS, IM, email, and/or other types of messages), multimedia information, and enable telecommunication with another user of another computing device. Moreover message client 244 may also interface with a web server configured to enable access to and/or management of messages. Other examples of application programs (not shown) include calendars, browsers, email clients, IM applications, SMS applications, VoIP applications, contact managers, task managers, transcoders, database programs, word processing programs, security applications, spreadsheet programs, games, search programs, and so forth. A browser application can be configured to receive and display graphics, text, multimedia, and the like, employing virtually any web based language. In one embodiment, the browser application is enabled to employ Handheld Device Markup Language (HDML), Wireless Markup Language (WML), WMLScript, JavaScript, Standard Generalized Markup Language (SMGL), HyperText Markup Language (HTML), eXtensible Markup Language (XML), and the like, to display and send messages. However, any of a variety of other web based languages may be employed.

Applications 243 may also include Inbound Message Server 246, Outbound Message Server 248, Message Account Registration Server 250, and Abusive Message Account Server 252. Servers 246, 248, 250, and 252, may also be arranged to access abusive use information regarding message accounts that is stored in data store 242. Abusive Message Account Server 252 performs one or more processes to determine a probability score as to whether the new message account is likely to be used for abusive purposes. And if the probability score is greater than or equal to a threshold, Abusive Message Account Server 252 employs the probability score and the operation of and information collected by Inbound Message Server 246, Outbound Message Server 248, Message Account Registration Server 250, and Abusive Message Account Data store 252 to deny, suspend, or request further information in regard to the registration and/or operation of a message account. Information related to the management, processing, and determining of data for abusive message accounts is generally stored in the Abusive Message Account Data store 252.

In one embodiment, message client 244 may be configured as a browser application with a downloadable plug-in, script, applet, widget, or the like, that is configured and arranged to manage abusive message account communications to and from the mobile device. Although a single message client 244 is illustrated it should be clear that multiple message client applications may be employed. For example, one message client may be configured to manage SMS messages, where another message client may manage IM messages, and yet another messaging client is configured to manage emails, or the like.

Illustrative Network Device Environment

Figure 3:
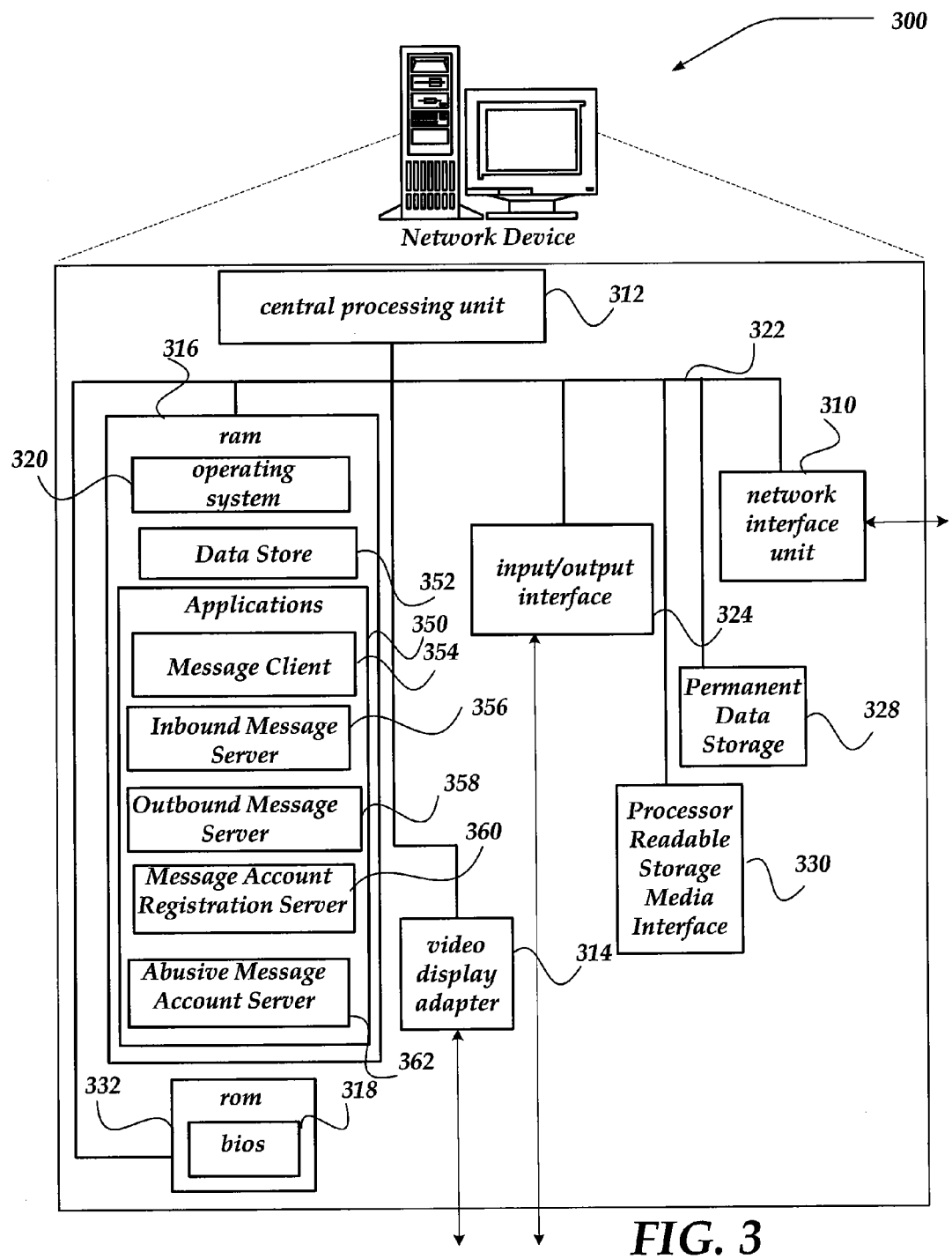
FIG. 3 illustrates a network device that enables operation of one embodiment of the invention.

FIG. 3 shows one embodiment of a network device, according to one embodiment of the invention. Network device 300 may include many more components than those shown. The components shown, however, are sufficient to disclose an illustrative embodiment for practicing the invention. Network device 300 may be arranged to enable the operation of Message Communication System 116 as shown in FIG. 1.

Network device 300 includes processing unit 312, video display adapter 314, Processor Readable Storage Media Interface 330, and a mass memory, all in communication with each other via bus 322. The mass memory generally includes RAM 316, ROM 332, and one or more permanent mass storage device(s) 328, such as a hard disk drive, tape drive, optical drive, and/or a floppy disk drive. The mass memory stores operating system 320 for controlling the operation of network device 300. Any general-purpose operating system may be employed. Basic input/output system ("BIOS") 318 is also provided for controlling the low-level operation of network device 300. As illustrated in FIG. 3, network device 300 also can communicate with the Internet, or some other communications network, via network interface unit 310, which is constructed for use with various communication protocols including the TCP/IP protocol. Network interface unit 310 is sometimes known as a transceiver, transceiving device, or network interface card (NIC).

Additionally, Processor Readable Storage Media Interface 330 is operative to provide access to processor readable information stored on various types of temporary and/or permanent storage media, including but not limited to, floppy disks, optical disks, hard disks, removable memory cards, removable memory sticks, FLASH memory drives, tape drives, and the like. Processor readable storage media may include volatile, nonvolatile, removable, and non-removable media implemented in any method or technology for storage of information, such as computer readable instructions, data structures, program modules, or other data. Examples of processor readable storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computing device.

The mass memory also stores program code and data. One or more applications 350 are loaded into mass memory and run on operating system 320. Examples of application programs may include transcoders, schedulers, calendars, database programs, word processing programs, HTTP programs, customizable user interface programs, IPSec applications, encryption programs, security programs, VPN programs, web servers, account management, and so forth. Applications 350 may include Inbound Message Server 356, Outbound Message Server 358, Message Account Registration Server 360, and Abusive Message Account Server 362. Servers 356, 358, 360, and 362, may also be arranged to access abusive use information regarding message accounts that is stored in data store 352. Also, the mass memory can also alternatively store abusive message account information within permanent data storage 328, or other processor readable storage medium 330.

Additionally, these applications can be based in the network device, in a mobile device, or in a distributed network. Thus, the invention may be implemented in a traditional client server arrangement, in a peer-to-peer network or any other architecture. Alternatively, the invention may be implemented as a software client run on currently existing platforms. A widget or messenger plug-in could implement the applications, where the applications are defined within the application layer.

Message client 354 may include virtually any computing component or components configured and arranged to communicate messages between message user agents, and/or other message clients, or to deliver messages to a local message storage, or the like. Message client 354 may employ any of a variety of communication protocols, including, but not limited, to Simple Mail Transfer Protocol (SMTP), Post Office Protocol (POP), Internet Message Access Protocol (IMAP), Session Initiation Protocol (SIP), NNTP, or the like. Also, Message client 354 may be configured to manage SMS messages, IM, MMS, IRC, mIRC, or any of a variety of other message types. Moreover message client 354 may also interface with a web server configured to enable access to and/or management of messages.

In one embodiment, message client 354 may be configured as a browser application with a downloadable plug-in, script, applet, widget, or the like, that is configured and arranged to manage abusive message account communications to and from the mobile device. Although a single message client 354 is illustrated it should be clear that multiple message client applications may be employed. For example, one message client may be configured to manage SMS messages, where another message client may manage IM messages, and yet another messaging client is configured to manage emails, or the like.

Abusive Message Account Server 362 performs one or more processes to determine a probability score as to whether the new message account is likely to be used for abusive purposes. And if the probability score is greater than or equal to a threshold, Abusive Message Account Server 362 employs the probability score and the operation of and information collected by Inbound Message Server 356, Outbound Message Server 358, Message Account Registration Server 360, and Abusive Message Account Data store 362 to deny, suspend, or request further information in regard to the registration and/or operation of a message account. Information related to the management, processing, and determining of data for abusive message accounts is generally stored in the Abusive Message Account Data store 362.

Generalized Operation

Figure 4:
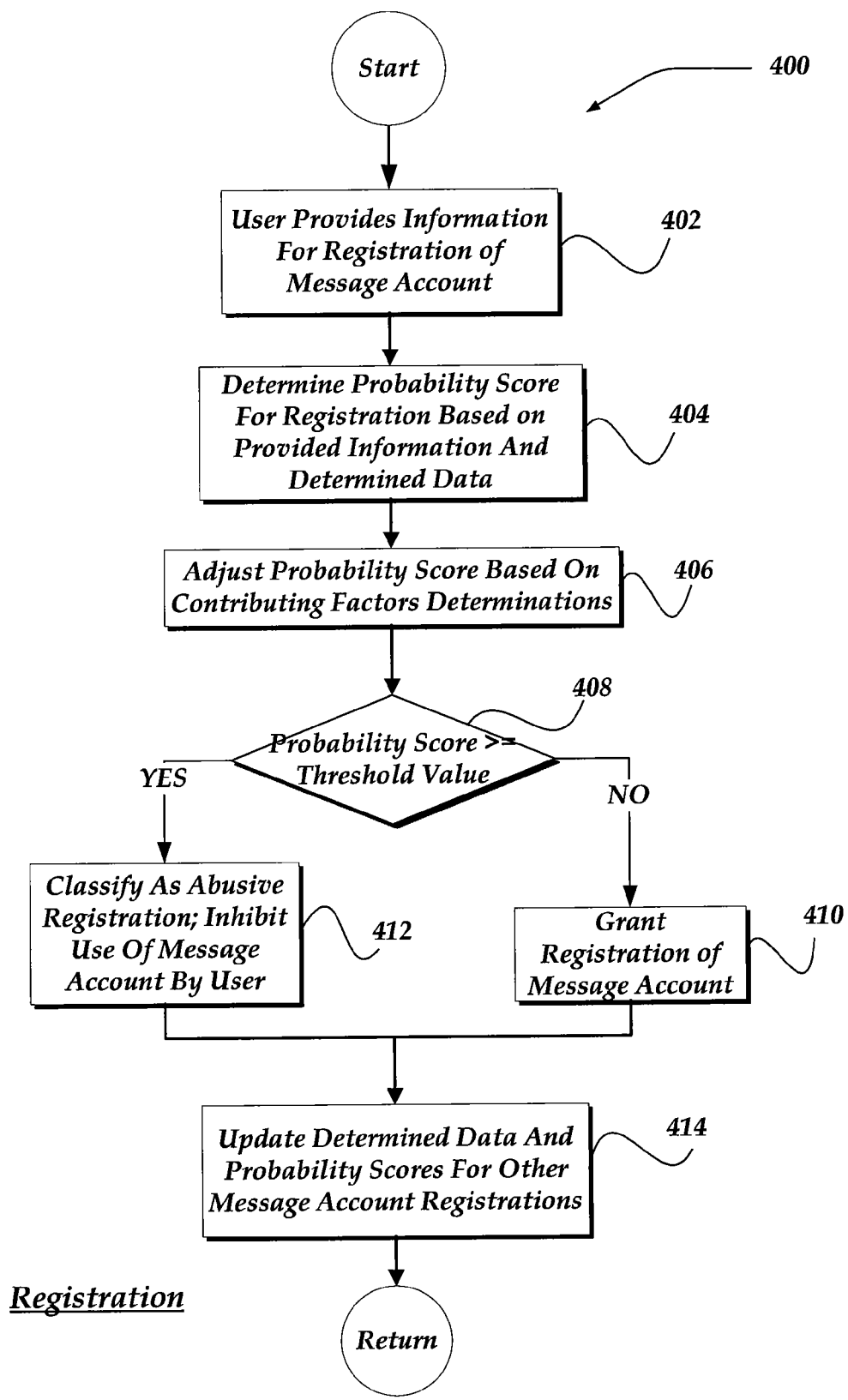
FIG. 4 shows a flow diagram of one process for detecting the probability that a new registration for a message account is likely to be abusively employed to send spam messages.

FIG. 4 illustrates a logical flow diagram generally showing one embodiment of a process for determining a probability score for abusive use for a registration for a message account. Moving from a start block to block 402, a user provides information to obtain a registration for a message account from a message account provider. The registration information often includes biographical information such as the user's name, address, date of birth, gender, affiliation, referral, and the like. Typically, the user is prompted to select a unique username and a password. In one or more embodiments, a temporary username and password is initially provided to the user, who is prompted to subsequently change the temporary username and/or password within a period of time.

At block 404, a probability score is determined based on the registration information itself and previously determined data from other message account registrations. The probability score may be expressed in a number of formats. In one embodiment, the probability score may range from zero to one as a three decimal place number, with one being the highest probability (a certainty) that the account is being registered for abusive purposes. For example, a probability score of 0.998 would indicate a 99.8 percent probability that the message account registration will be used for abusive purposes. In one embodiment, the probability values are tabulated, and in other embodiments these probability values may be weighted, or some combination of tabulation and weighting. Also, a more detailed description of this determination of the probability score is discussed in FIG. 5.

At block 406, the probability score may be adjusted based on contributing factors. A more detailed description of the contributing factors determinations are set forth in more detail in FIG. 6. Next, the process steps to decision block 408 where the probability score is compared against a threshold value. As an example, if the probability score is greater than or equal to the threshold value, than the message account registration would be classified as abusive and inhibited from sending messages. In this case, the process may deactivate, deny, require more information and/or analysis, or suspend the message account registration. Also, in one or more embodiments, the threshold value may be adjusted either automatically and/or manually to reduce false positives, i.e., message account registrations that are incorrectly identified as abusive.

At decision block 408, if the probability score is less than the threshold value, then the process moves to block 410 where the message account registration is granted, and the user is enabled to send messages to other message accounts. Alternatively, if the determination at decision block 408 is equal to or greater than the threshold value, the process moves to block 412 where the message account registration is classified as abusive. And the abusive message account registration is inhibited from sending further messages. As an example, if the message account registration is classified as abusive, then the process may deactivate, deny, require more information and/or analysis, or suspend activities in regard to the message account registration. Additionally, in at least one embodiment, the threshold value may be adjusted either automatically and/or manually to reduce false positives, i.e., message account registrations that are incorrectly identified as abusive.

Once the process has moved to either block 412 or block 410, it subsequently moves to block 414 where the determined data and probability scores for other message account registrations is updated. In this way, feedback from a successful or unsuccessful message account registration can be employed to continuously reevaluate previously granted message account registrations. Next, the process returns to performing other actions.

Also, the process flow set forth FIG. 4 may be repeated more than once for previously granted message account registrations. More specifically, the process flow may occur initially at the time of registration of a new message account. And the process flow may substantially occur again after the initial registration is granted and once additional message registrations have been either granted or classified as abusive.

Also, further information may be collected about the message account registration, such as the number of messages sent, the content of the inbound or outbound messages, other accounts that were registered with similar contact information and the like. Thus, the probability score for abusive use of a message account registration may be adjusted/updated upwards or down over time.

Figure 5:
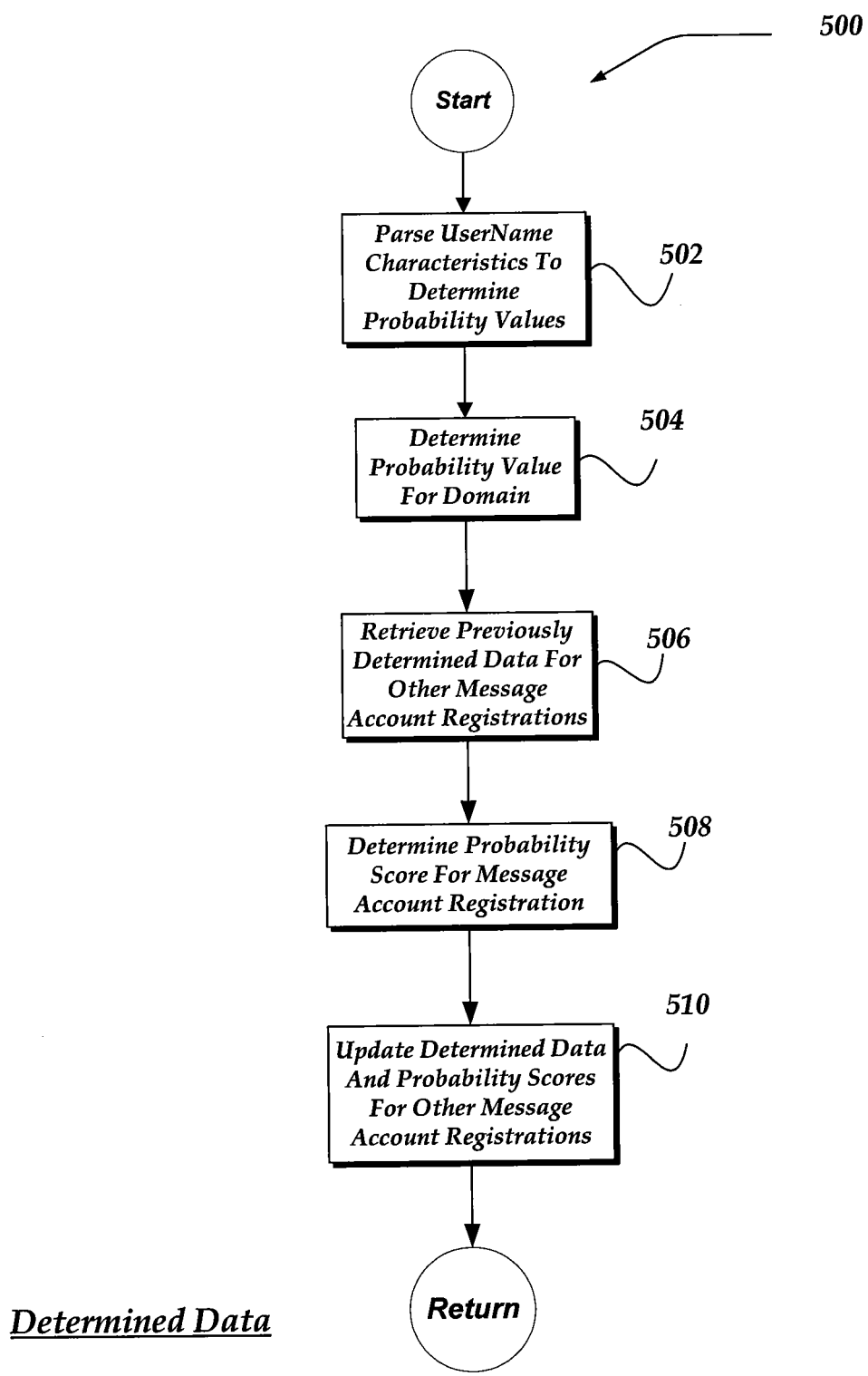
FIG. 5 illustrates a process for employing heuristically determined data to detect the probability that a message account is abusively employed to send spam messages.

FIG. 5 illustrates a process for determining a probability score for a message account based on determined data and provided registration information.

The process moves from a start block to block 502 where the username characteristics are parsed to determine probability values. For example, the amount of transitions between characters, numbers and symbols, the amount of numbers, the amount of letters and the amount of symbols are parsed. The process compares these parsed characteristics to predetermined probability values such as those illustrated in Table 1 listed below. These probability values can be derived from statistical analysis and/or heuristic values for usernames that corresponded to previously classified abusive message account registrations.

TABLE 1

| Rule No. | Length | No. of Transitions | No. of Digits | No. of Letters | No. of Symbols | Probability Score |
|---|---|---|---|---|---|---|
| 1 | >=11 | >=5 | >=3 | >=4 | — | 0.998 |
| 2 | >=19 | — | — | — | <=1 | 0.985 |
| 3 | >15 <=19 | — | >0 | >5 | — | 0.969 |
| 4 | >19 | — | >0 | — | >1 | 0.981 |
| 5 | <=15 | >3 | — | — | — | 0.959 |
| 6 | >15 <=19 | — | >0 | <=5 | >0 | 0.912 |
| 7 | <=15 >12 | =1 | >5 | <=7 | 0 | .897 |

Table 1 shows examples of rule values that may be applied and the associated probability score for any username that meets those values. In the Table, for instance, Rule 3 assigns a probability value of 0.969 to any username that has a length greater than 15 and less than or equal to 19 characters, that contains more than five digits and transitions between a character, number or symbol at least once.

As an example, the username "sexy_stranger199808" is 19 units in length, has 3 transitions, 6 digits, 12 letters and one symbol. As such, this username would meet the requirements of Rules 1, 2 and 3. The probability score may be set to the highest, lowest or an average of the three values. Alternatively, the probability score may be set to some other mathematical combination of the three values. In this instance, the highest probability score would be 0.998, which in one embodiment may be the assigned probability value. If this username were selected during registration and the threshold probability value was set to 0.995, a request to register an account with this username would be classified as an abusive message account registration. Statistical analysis may include other features of the username to distinguish between legitimate and abusively registered message accounts. For example, the appearance of certain combinations of letters, symbols or numbers may provide statistically significant distinctions.

At block 504, a probability value is determined for the domain that corresponds to the username of the message account registration. The probability value for the domain may be determined by statistical analysis, heuristic analysis, or another process. Typically, a check is performed on an unknown domain such as a Sender Policy Framework, Domain Keys, or the like. Moving to block 506, the process employs previously determined data from other message account registrations classified as abusive to further determine the probability values for a particular message account registration. For example, amount of previous outbound messages from that message account within a time period, amount of previous inbound messages with similar content from other message accounts, amount of recipients of inbound messages sent by the message account, content of messages, network IP address of the user's request for the message account, and the like.

At block 508, the probability score for the message account registration is determined based on some combination of the determined probability values. In one embodiment, the probability values are tabulated, and in other embodiments these probability values may be weighted, or some combination of tabulation and weighting.

Flowing to block 510, the determined data and probability scores for the other message account registrations are updated based on the determined data and probability score of the current message account registration. Next, the process returns to performing other actions.

Figure 6:
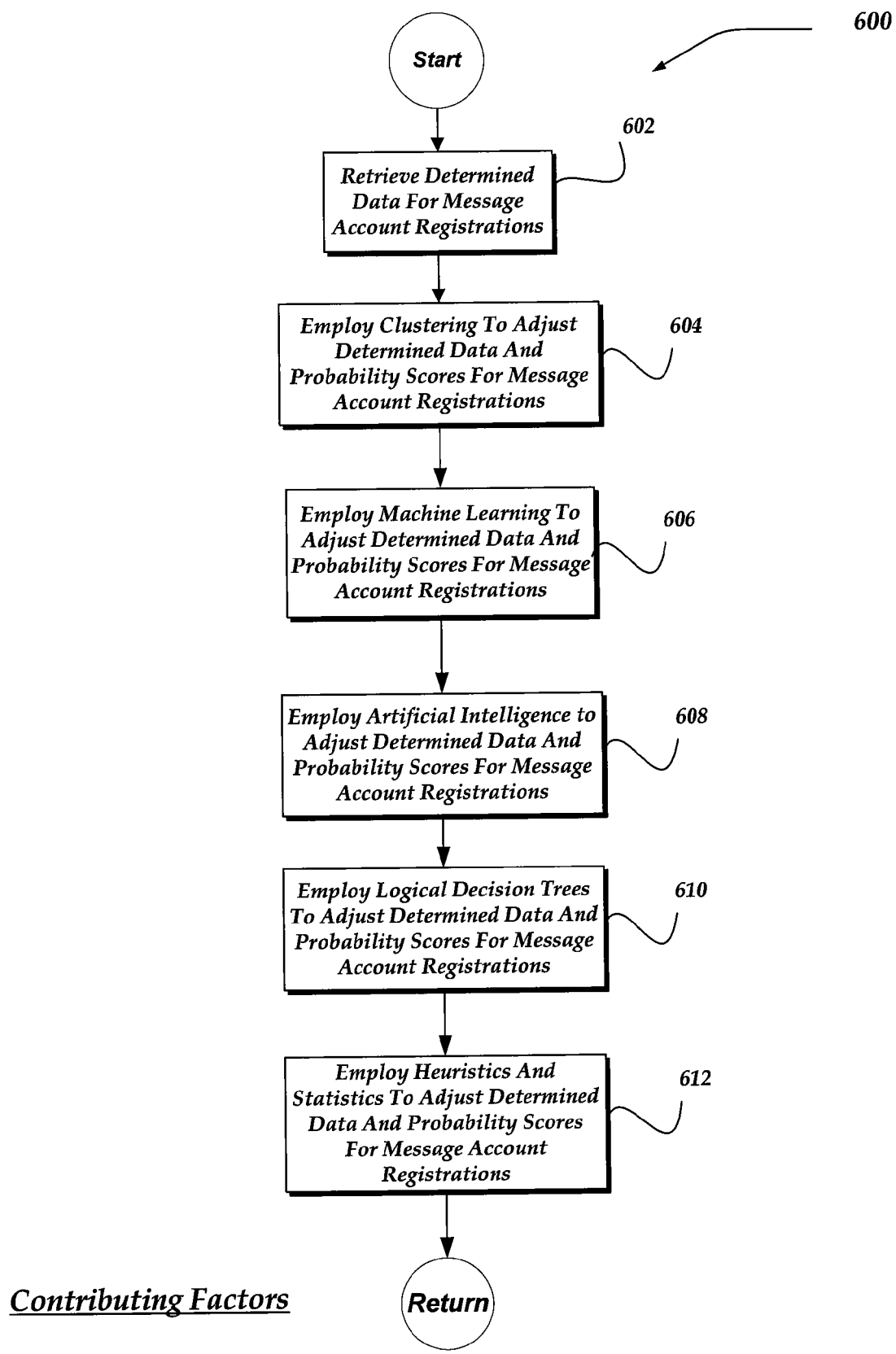
FIG. 6 shows a process for employing contributing factors to detect the probability that a message account is abusively employed to send spam messages.

The process flow of FIG. 6 illustrates the use of contributing factors in determining whether an account is or was registered for abusive or fraudulent purposes. Moving from a start block, the process moves to block 602 where determined data from multiple message account registrations is retrieved from a data store for analysis of its characteristics.

There are a number of characteristics that are indicative of a higher probability that a message account is registered for abusive purposes. The contributing factors may be such things as the similarity of the registration information to the registration information of other previously registered users that opened abusive message accounts. A high degree of similarity to multiple other user registration information may indicate a high degree of probability that the current registration is intended for abusive purposes, such as spam. This comparison may include a temporal component, such as having 100 "John Smith" registrations applied for with ten minutes of each other. Other information may be compared such as the similarity of names, addresses or zip codes. Also, yet other comparisons may include a high velocity of outbound and/or inbound messages, a high number of message recipients, consistently short or long messages and other types of patterns or characteristics that can distinguish non-abusive use from abusive use of a message account registration.

Another factor that may be used is the confirmation of the user agent for the user. A user agent is the client application used with a particular network protocol; the phrase is most commonly used in reference to those which access the World Wide Web, but other systems such as SIP uses the term user agent to refer to the user's phone. Web user agents range from web browsers and e-mail clients to search engine crawlers, as well as mobile phones, screen readers and Braille browsers used by people with disabilities. When Internet users visit a web site, a text string is generally sent to identify the user agent to the server. This forms part of the HTTP request, prefixed with user agent, and typically includes information such as the application name, version, host operating system, and language. An improper user agent identification, such as a misspelling or typo in the information, is an indicator that the registration may be for an improper purpose.

At block 604, clustering analysis may be performed on the characteristics of previously determined data and probability scores for the multiple message account registrations. For example, if similar characteristics are identified for a cluster of abusive message account registrations and/or their message traffic, the previously determined data and probability scores for message account registrations may be adjusted/updated accordingly.

At block 606, a machine learning process may monitor determined data and probability scores for multiple message account registrations. And if similar characteristics are identified for abusive message account registrations and/or their message traffic, heuristic values, statistical values, and/or other values for the determined data and the respective probability scores may be adjusted/updated for message account registrations. Also, at block 608, an artificial intelligence process may monitor determined data and probability scores for multiple message account registrations. And if similar characteristics are identified for abusive message account registrations and/or their message traffic, heuristic values, statistical values, and/or other values for the determined data and the respective probability scores may be adjusted/updated for message account registrations.

At block 610, logical decision tree processes may be performed on previously determined data and probability scores for the multiple message account registrations. Based on the logic tree classification of a message account registration and/or message traffic as abusive, the previously determined data and probability scores for message account registrations may be adjusted/updated accordingly.

At block 612, heuristic analysis and/or statistical analysis may be performed on previously determined data and probability scores for the multiple message account registrations. Based on the heuristic and/or statistical classification of a message account registration and/or message traffic as abusive, the previously determined data and probability scores for message account registrations may be adjusted/updated accordingly. Next, the process returns to other actions.

Additionally, for the process shown in FIG. 6, the probability values for updating the probability scores can be tabulated, weighted, or some combination of tabulation and weighting.

Figure 7:
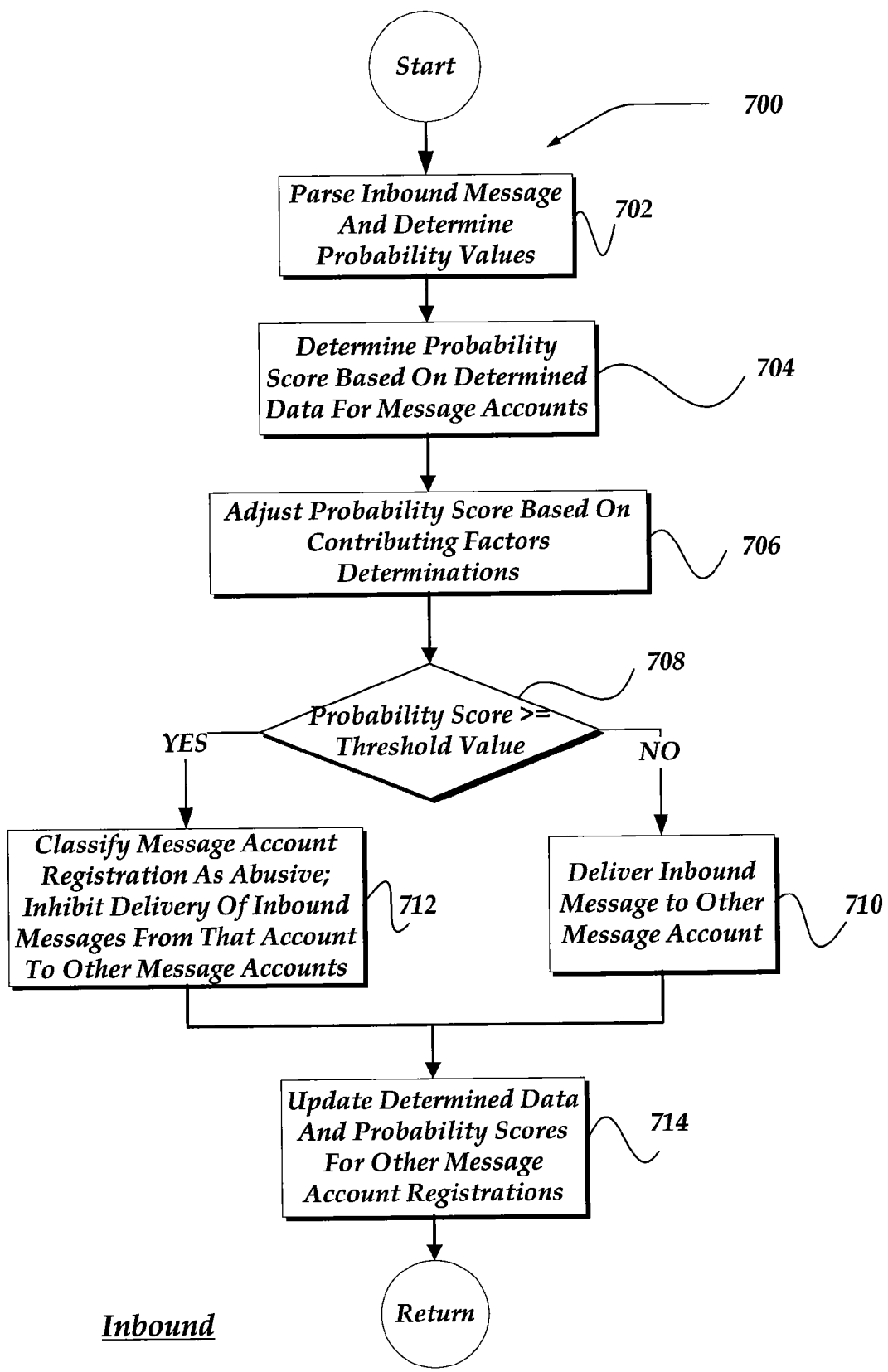
FIG. 7 illustrates a flow diagram for processing inbound messages for abusive use of a message account for spam messages.

FIG. 7 generally shows one embodiment of a process for determining a probability score for abusive use of a message account based on at least one inbound message. Moving from a start block to block 702, an inbound message for a message account is parsed. Probability values are determined for characteristics associated with the inbound message, e.g., the source domain, the username of the sender of the inbound message, the velocity of similar inbound messages both from the sender and other senders classified as abusive message accounts, the content of the inbound message, and the like.

At block 704, a probability score is determined based on the determined probability values and previously determined data and probability scores for other message account registrations. The probability score may be expressed in a number of formats. In one embodiment, the probability score may range from zero to one as a three decimal place number, with one being the highest probability (a certainty) that the account is being registered for abusive purposes. For example, a probability score of 0.998 would indicate a 99.8 percent probability that the message account registration will be used for abusive purposes. Also, a substantially more detailed description of the determinations for the probability values and the probability score are discussed in FIG. 5 above.

At block 706, the probability score may be adjusted based on contributing factors. A substantially more detailed description of the contributing factors determinations are set forth in FIG. 6 above. Next, the process steps to decision block 708 where the probability score is compared against a threshold value.

At decision block 708, if the probability score is less than the threshold value, then the process moves to block 710 where the inbound message is delivered to the destination message account. Alternatively, if the determination at decision block 708 is equal to or greater than the threshold value, the process moves to block 712 where the inbound message, the username associated with the inbound message, and the message account registration (if accessible to the process) are classified as abusive. And the current inbound message and subsequent inbound messages from the username are not delivered to the inbox of the destination message account. Also, if the message account registration is accessible to the process, it is inhibited from sending further messages.

As an example, if the probability score is greater than or equal to the threshold value, than the incoming message would be classified as abusive and not delivered to the destination message account. Also, if the message account that is the source/sender of an abusive inbound message is accessible to the process, then the process may deactivate, deny, require more information and/or analysis, or suspend activities in regard to the sender message account. Additionally, in at least one embodiment, the threshold value may be adjusted either automatically and/or manually to reduce false positives, i.e., message account registrations that are incorrectly identified as abusive.

Once the process has moved to either block 712 or block 710, it subsequently moves to block 714 where the determined data and probability scores for other message account registrations are updated. In this way, feedback from identifying an abusive inbound message can be employed to continuously reevaluate previously granted message account registrations. Next, the process returns to performing other actions.

Additionally, for the process shown in FIG. 7, the probability values for the probability scores can be tabulated, weighted, and/or some combination of tabulation and weighting.

Figure 8:
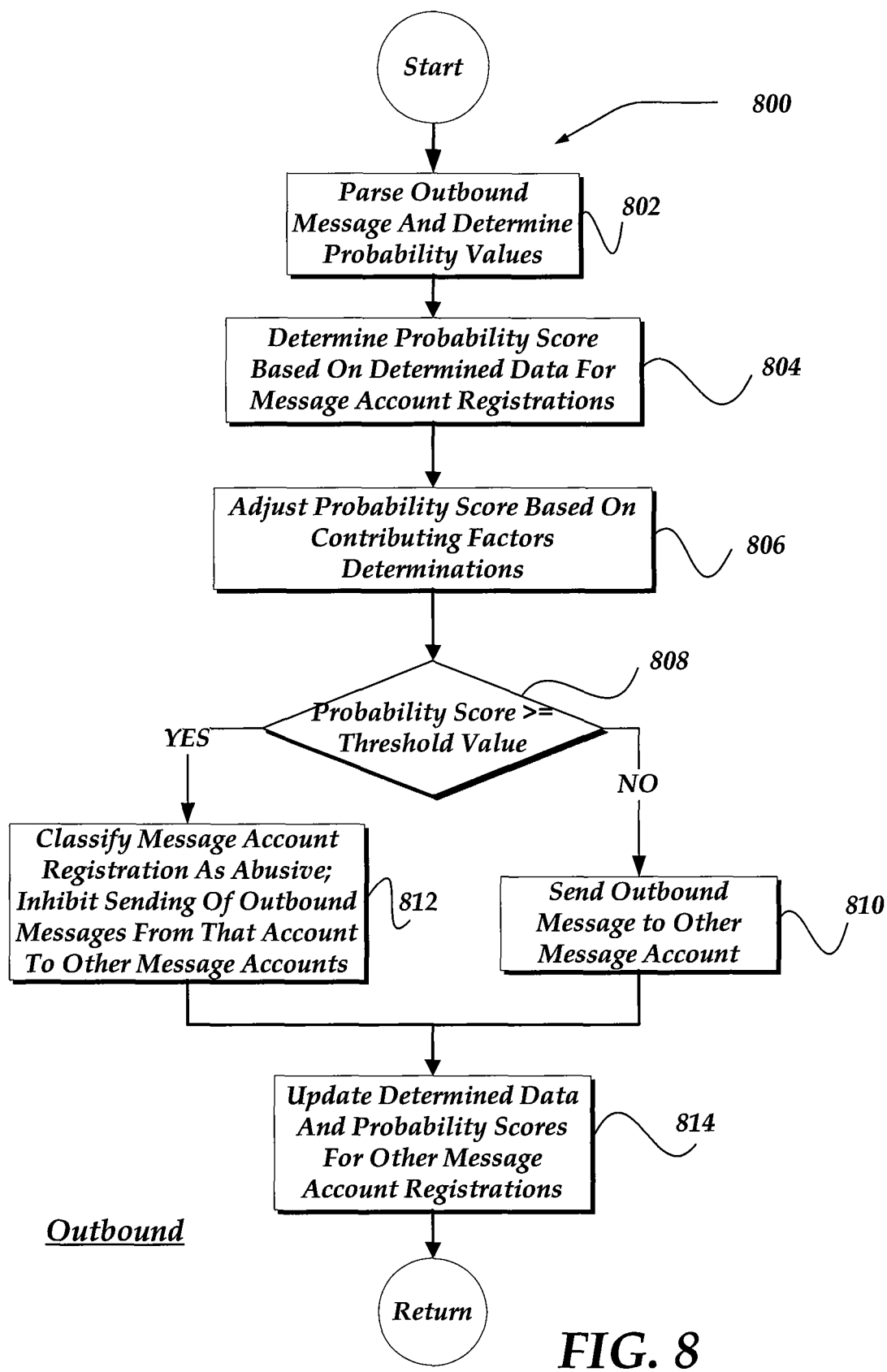
FIG. 8 shows a flow diagram for processing outbound messages for abusive use of a message account for spam messages in accordance with the invention.

FIG. 8 generally shows one embodiment of a process for determining a probability score for abusive use of a message account based on at least one outbound message. Moving from a start block to block 802, an outbound message for a message account is parsed. Probability values are determined for characteristics associated with the outbound message, e.g., the source domain, the velocity of similar outbound messages both from the message account and other messages sent by other message accounts that are classified as abusive, the content of the outbound message, and the like.

At block 804, a probability score is determined based on the determined probability values and previously determined data and probability scores for other message account registrations. The probability score may be expressed in a number of formats. In one embodiment, the probability score may range from zero to one as a three decimal place number, with one being the highest probability (a certainty) that the account is being registered for abusive purposes. For example, a probability score of 0.998 would indicate a 99.8 percent probability that the message account registration will be used for abusive purposes. Also, a substantially more detailed description of the determinations for the probability values and the probability score are discussed in FIG. 5 above.

At block 806, the probability score may be adjusted based on contributing factors. A substantially more detailed description of the contributing factors determinations are set forth in FIG. 6 above. Next, the process steps to decision block 808 where the probability score is compared against a threshold value.

At decision block 808, if the probability score is less than the threshold value, then the process moves to block 810 where the outbound message is sent to the destination message account. Alternatively, if the determination at decision block 808 is equal to or greater than the threshold value, the process moves to block 812 where the outbound message, the message account registration associated with the outbound message are classified as abusive. And the current outbound message and subsequent outbound messages are not sent to the destination message account. Also, if the message account registration is accessible to the process, it is inhibited from sending further messages.

As an example, if the probability score is greater than or equal to the threshold value, than the outgoing message would be classified as abusive and not sent to the destination message account. Also, if the message account that is the source/sender of an abusive inbound message is accessible to the process, then the process may deactivate, deny, require more information and/or analysis, or suspend activities in regard to the abusive sender message account. Additionally, in at least one embodiment, the threshold value may be adjusted either automatically and/or manually to reduce false positives, i.e., message account registrations that are incorrectly identified as abusive.

Once the process has moved to either block 812 or block 810, it subsequently moves to block 814 where the determined data and probability scores for other message account registrations are updated. In this way, feedback from identifying an abusive outbound message can be employed to continuously reevaluate previously granted message account registrations. Next, the process returns to performing other actions.

Additionally, for the process shown in FIG. 8, the probability values for the probability scores can be tabulated, weighted, or some combination of tabulation and weighting.

It will be understood that each block of the flowchart illustrations, and combinations of blocks in the flowchart illustration, can be implemented by program instructions. These program instructions may be provided to a processor to produce a machine, such that the instructions, which execute on the processor, create means for implementing the actions specified in the flowchart block or blocks. The program instructions may be executed by a processor to cause a series of operational steps to be performed by the processor to produce a process such that the program instructions, which execute on the processor to provide steps for implementing the actions specified in the flowchart block or blocks. The program instructions may also cause at least some of the operational steps shown in the blocks of the flowchart to be performed in parallel. Moreover, some of the steps may also be performed across more than one processor, such as might arise in a multi-processor computer system. In addition, one or more blocks or combinations of blocks in the flowchart illustration may also be performed concurrently with other blocks or combinations of blocks, or even in a different sequence than illustrated without departing from the scope or spirit of the invention.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware-based systems which perform the specified actions or steps, or combinations of special purpose hardware and computer instructions.

The above specification, examples, and data provide a complete description of the manufacture and use of the composition of the invention. Since many embodiments of the invention can be made without departing from the spirit and scope of the invention, the invention resides in the claims hereinafter appended.

What is claimed as new and desired to be protected is:

1. A network device, comprising:
   a transceiver to send and receive data over a network; and
   a processor that receives data from and sends data to the transceiver, and performs actions, including:
      in response to a request from a new user for a registration for a message account, determining a plurality of user probability values based on at least biographical information, a username and a password for the new user, a network address that is associated with the request, and a degree of similarity of at least a portion of the new user's contact information to at least a portion of multiple other user registration information provided for registering at least another message account within a defined time period, each user probability value is a probability that the message account will be used for abusive purposes;
      if the plurality of user probability values are classified as abusive in comparison to at least a determined threshold value, inhibiting the message account from at least sending a message to another message account; and
      in response to receiving a message inbound to the message account:
         parsing the inbound message to identify a plurality of message characteristics, including at least a message username and message account registration information associated with the inbound message;
         analyzing the plurality of message characteristics to determine a plurality of probability values for the message;
         assigning a probability score to the inbound message based in part on the determined plurality of probability values and previously determined data and probability scores for a plurality of other message accounts;
         classifying the inbound message and related message account as abusive based on the assigned probability score being at or above a determined threshold value; and
         if the inbound message is classified as abusive, inhibiting delivery of the inbound message; otherwise, enabling the inbound message to be delivered to the message account.

2. The network device of claim 1, wherein analyzing the plurality of message characteristics further comprises:
   analyzing the message username to determine at least one or more of a length of the username, an amount of transitions in the username, an amount of numbers in the username, an amount of letters in the username, or an amount of symbols in the username; and
   based on the analysis of the message username, employing at least one rule to assign a probability value to the inbound message.

3. The network device of claim 1, wherein analyzing the plurality of message characteristics further comprises:
   determining a network domain corresponding to the inbound message as at least one message characteristic in the plurality of message characteristics; and
   determining a probability value based on the determined network domain, including at least based on whether the determined network domain is an unknown network domain or based on a relationship between the determined network domain and a network domain associated with the message account.

4. The network device of claim 1, wherein analyzing the plurality of message characteristics further comprises:
   analyzing a velocity of similar inbound messages both from the message username associated with the inbound message and from other message accounts previously classified as abusive message accounts; and
   determining a probability value based on the analysis of the velocity.

5. The network device of claim 1, wherein analyzing the plurality of message characteristics further comprises:
   analyzing a content of similar inbound messages both from the same message username associated with the inbound message and from other message accounts previously classified as abusive message accounts; and
   determining a probability value based on the analysis of the content.

6. The network device of claim 1, wherein the processor performs actions, further including:
   retrieving a plurality of characteristics and probability scores associated with a plurality of other message account registrations;
   determining a degree of similarity of a message account registration for the message account associated with the inbound message and a plurality of other message account registrations that are identified as abusive message accounts; and
   based on the degree of similarity, adjusting the probability score to the inbound message.

7. A processor readable non-transitory storage medium that includes data and instructions, wherein the execution of the instructions on a computing device by enabling actions, comprising:
   in response to a request from a new user for a registration for a message account, determining a plurality of user probability values based on at least biographical information, a username and a password for the new user, a network address that is associated with the request, and a degree of similarity of at least a portion of the new user's contact information to at least a portion of multiple other user registration information provided for registering at least another message account within a defined time period, each user probability value is a probability that the message account will be used for abusive purposes;
   if the plurality of user probability values are classified as abusive in comparison to at least a determined threshold value, inhibiting the message account from at least sending a message to another message account; and
   in response receiving a message inbound to the message account:
      parsing the inbound message to identify a plurality of message characteristics, including at least a message username, and message account registration information associated with the inbound message;
      analyzing the plurality of message characteristics to determine a plurality of probability values for the message;
      assigning a probability score to the inbound message based in part on the determined plurality of probability values and previously determined data and probability scores for a plurality of other message accounts;
      adjusting the probability score for the inbound message based in part on contributing factors indicating whether the message account related to the inbound message was previously used for abusive or fraudulent purposes;

classifying the inbound message and the related message account as abusive based on the assigned probability score being at or above a determined threshold value; and if the inbound message is classified as abusive, inhibiting delivery of the inbound message; otherwise, enabling the inbound message to be delivered to the message account.

8. The processor readable storage medium of claim 7, wherein adjusting the probability score further comprises:

identifying from the parsed plurality of message characteristics the message account;

using the identified message account to retrieve related message account registration information;

retrieving a plurality of characteristics and probability scores associated with the plurality of other message account registrations;

clustering at least a subset of the plurality of characteristics and probability scores associated with the plurality of other message account registrations based in part on a determined similarity in characteristics between the plurality of other message account registrations and the message account registration information for the inbound message;

determining an adjustment for the probability score of the inbound message based on the clustering of at least the subset of plurality of characteristics and probability scores; and applying the adjustment to the assigned probability score for the inbound message.

9. The processor readable storage medium of claim 7, wherein adjusting the probability score further comprises employing at least one of a machine learning, artificial intelligence or logical decision tree analysis to adjust the probability score of the inbound message.

10. The processor readable storage medium of claim 7, wherein adjusting the probability score further comprises:

wherein the determined contributing factors include at least one of a feature of an application used for registration of the message account associated with the inbound message; and adjusting the probability score for the inbound message based on a probability value associated with the application used.

11. The processor readable storage medium of claim 7, wherein the contributing factors further comprise at least one of a similarity of contact information for the message account associated with the inbound message and other message accounts within a time period, or previous abusive use by the associated message account.

12. The processor readable storage medium of claim 7, wherein the contributing factors further comprise at least one of an amount of previous inbound messages from the message account associated with the inbound message, or an amount of recipients of the inbound message sent by the associated message account.

13. The processor readable storage medium of claim 7, wherein the instructions enable actions, further including:

employing the contributing factors, the adjusted probability score, or the plurality of message characteristics to update a probability score for at least one other message account.

14. A system for enabling a communications over a network, comprising:

a data storage device having stored thereon, a plurality of abusive message account data from at least a plurality of message account registrations; and one or more processors configured to employ data from the data storage device to perform actions, including:

in response to a request from a new user for a registration for a message account, determining a plurality of user probability values based on at least biographical information, a username and a password for the new user, a network address that is associated with the request, and a degree of similarity of at least a portion of the new user's contact information to at least a portion of multiple other user registration information provided for registering at least another message account within a defined time period, each user probability value is a probability that the message account will be used for abusive purposes;

if the plurality of user probability values are classified as abusive in comparison to at least a determined threshold value, inhibiting the message account from at least sending a message to another message account; and in response to receiving a message inbound to the message account:

parsing the inbound message to identify a plurality of message characteristics, including at least a message account, message username, and message account registration information associated with the inbound message;

analyzing the plurality of message characteristics to determine a plurality of probability values for the message;

assigning a probability score to the inbound message based in part on the determined plurality of probability values and previously determined data and probability scores for a plurality of other message accounts;

classifying the inbound message and related message account as abusive based on the assigned probability score being at or above a determined threshold value; and if the inbound message is classified as abusive, inhibiting delivery of the inbound message; otherwise, enabling the inbound message to be delivered to the message account.

15. The system of claim 14, wherein the one or more processors perform actions, further including:

determining a plurality of contributing factors from the plurality of abusive message account data from the plurality of message account registrations;

determining a plurality of other contributing factors based on message account registration information associated with the inbound message;

comparing the determined plurality of contributing factors with the plurality of other contributing factors; and adjusting the probability score based the comparison.

16. The system of claim 14, wherein parsing the inbound message further comprises:

parsing a plurality of characters in the message username to determine various statistics about the message username including at least one of a length of the message username based on the plurality of characters, a number of transitions between the plurality of characters, a number of digits, a number of letters, or a number of symbols; and employing one or more rules to assign the probability score based on the statistics about the message username.

17. The system of claim 16, wherein employing the one or more rules, further comprises:
clustering a plurality of characteristics about a username associated with the inbound message and probability scores associated with the plurality of other message account registrations based in part on a determined similarity in characteristics between the plurality of other message account registrations and message account registration information for the inbound message;
determining an adjustment for the probability score of the inbound message based on the clustering of at least the subset of plurality of characteristics and probability scores; and
applying the adjustment to the assigned probability score for the inbound message.

18. The system of claim 14, wherein if the inbound message is classified as abusive, further classifying the message account associated with the inbound message as abusive.

19. The system of claim 14, wherein analyzing the plurality of message characteristics further comprises:
determining a network domain corresponding to the inbound message as at least one message characteristic in the plurality of message characteristics; and
determining a probability value based on the determined network domain, including at least based on whether the determined network domain is an unknown network domain and a relationship between the determined network domain and a network domain associated with the message account.

20. The system of claim 14, wherein the classification of the inbound message is employed to continuously re-evaluate a classification of at least one other previously classified message account.

* * * * *